United States Patent [19]

Helser et al.

[11] 4,219,515

[45] Aug. 26, 1980

[54] WATER ALKALINITY CONTROL IN THE MANUFACTURE OF HYDROUS SILICATE PRODUCTS

[75] Inventors: Jerry L. Helser, Hebron; William H. Rigby, Jr., Newark, both of Ohio

[73] Assignee: Owens-Corning Fiberglas Corporation, Toledo, Ohio

[21] Appl. No.: 944,449

[22] Filed: Sep. 21, 1978

[51] Int. Cl.$^2$ ............................................... B28B 3/00
[52] U.S. Cl. ..................................... 264/37; 162/190; 264/82; 264/86
[58] Field of Search ............................ 264/37, 82, 86; 162/190

[56] References Cited

U.S. PATENT DOCUMENTS

| | | | |
|---|---|---|---|
| 2,850,786 | 9/1958 | Dubbs | 264/37 X |
| 3,262,877 | 7/1966 | Le Compte | 162/190 X |
| 3,902,913 | 9/1975 | Helser et al. | 106/120 |

*Primary Examiner*—Thomas P. Pavelko
*Attorney, Agent, or Firm*—Ronald C. Hudgens; Philip R. Cloutier; James B. Wilkens

[57] ABSTRACT

The water resulting from the filter press molding of slurries of hydrated lime and reactive silica in the manufacture of hydrous calcium silicate products is recycled to the process by treating it with carbon dioxide to precipitate dissolved calcium hydroxide, filtering, and returning the filtered water to the process step wherein the lime and silica are slurried in water.

4 Claims, No Drawings

WATER ALKALINITY CONTROL IN THE MANUFACTURE OF HYDROUS SILICATE PRODUCTS

NATURE OF THE INVENTION

This invention relates to processes for manufacturing hydrous calcium silicate products. More specifically it is concerned with the treatment and recycling of waste water streams resulting from the process.

BACKGROUND OF THE INVENTION

The term hydrous calcium silicate denotes a crystalline compound formed by the reaction of lime (CaO), silica ($SiO_2$), and water ($H_2O$). The two hydrous calcium silicates that generally are of interest are: tobermorite having the formula $4CaO.5SiO_2.5H_2O$; and xonotlite, having the formula $5CaO.5SiO_2.XH_2O$. Hydrous calcium silicate products often are used as heat insulation materials.

Methods for reacting and drying a molded aqueous slurry of reactive cementitious constituents and reinforcing fibers to form hydrous calcium silicate insulation products are known in the art. One such method includes placing a molded slurry of the reactive cementitious constituents and reinforcing fibers in an autoclave, introducing pressurized saturated steam into the autoclave to indurate the slurry, and removing the products from the autoclave. Another such method includes placing a molded slurry of the reactive cementitious constituents and reinforcing fibers in an autoclave, introducing pressurized saturated steam into the autoclave to indurate the slurry, simultaneously further indurating and drying the slurry with superheated steam to convert the slurry to a final product, reducing the pressure in the autoclave to atmospheric pressure, and removing of the product.

In practice the principal slurry constituents, i.e. calcareous and siliceous materials, reinforcing fibers and water are mixed to form a slurry which is then molded to impart a predetermined shape to the slurry and final product. The slurry is molded or shaped in any convenient manner. Generally, however, one of two types of molds is employed, i.e. pan molds or filter press molds. In pan molds, the slurry remains in the mold while the cementitious materials are reacted to convert them to a hydrous calcium silicate insulation. A pan mold generally defines a mold cavity of a particular shape and dimension; e.g. a flat rectangular pan is used to form flat ware or blocks, while an arcuate, generally U-shaped mold forms half-section insulation pieces used to form molded pipe covering for insulating pipes, ducts, and the like. The filter press mold generally comprises a perforated molding surface over which the slurry is poured. A perforated mechanical piston, complementary in shape to the mold, compresses the slurry and dewaters it to the point where it is self-supporting. It is with the processing and recycling of the water expressed from the filter press mold at this point in the process that this invention is most concerned.

The filter press molding technique is described in U.S. Pat. No. 2,699,097 and is used to form pipe covering and flat ware.

One method disclosed herein introduces pressurized, saturated steam into a closed system or autoclave in sufficient amount to bring the pressure in the autoclave to 100 to 350 psi at a temperature ranging from 328°–406° F. in 30 minutes or less and preferably within 15 to 30 minutes after the introduction of the steam begins. (The term "pressure" as used herein refers to gauge pressure (in pounds per square inch), i.e. the pressure above that of the atmosphere.)

The slurry is then maintained under this steam pressure in the autoclave for a period of time sufficient to indurate the slurry. After the product has been removed from the autoclave, it can be dried in an auxiliary drier, if required. The drying temperature in the auxiliary drier must be below the decomposition point of the organic fiber reinforcement to achieve best possible strength of the product.

The other method disclosed herein introduces pressurized, saturated steam into a closed system or autoclave in sufficient amount to bring the pressure in the autoclave to 100 to 350 psi in 30 minutes or less and preferably within 15 to 30 minutes after the introduction of the steam begins. (The term pressure as used herein refers to gauge pressure (in pounds per square inch), i.e. the pressure above that of the atmosphere.) After the introduction of the steam, the temperature in the autoclave is raised by heating coils to temperature ranging from about 407° to about 600° F. to produce the superheated steam.

The slurry is then maintained in the autoclave until a predetermined percentage of the moisture (by weight) of the ware has been removed by evaporation into the superheated steam atmosphere. The free moisture is reduced substantially during the cycle, but never drops below 10% by weight of solids during the entire cycle. While continuing to circulate the steam in the system, the pressure in the autoclave is reduced to atmosphere conditions within 60 minutes or less and the final product is removed. The product subsequently can be dried in an auxiliary drier, if required. The drying temperatures in the auxiliary drier must be below the decomposition point of the organic fiber reinforcement, or a brittle product is obtained. The retention of at least 10% by weight-free moisture in the molded slurry allows for simultaneous indurating and drying in an autoclave at temperatures above the decomposition point of the reinforcing organic fibers.

The expressed water resulting from the filter press molding technique results in an accumulation of considerable quantities of waste water. The original gel can contain a weight ratio of water to solids of 12:1 and in the filter press operation this ratio is reduced to 4.5:1. The waste water coming from the filter press step is collected ordinarily in water reclaim pits and is primarily a solution of calcium hydroxide containing suspended matter.

It is highly desirable to minimize the amount of water consumed in the overall manufacturing process, particularly since the consumption of water by industry increasingly is subject to restriction. Further, it is desirable to recycle this filter press waste water through the plant operating system rather than dump it. If, however, the water is to be recycled the calcium hydroxide dissolved therein must be removed. The concentration of calcium hydroxide present is subject to such variations in the process that it is more efficient to remove the calcium hydroxide from the waste water than it is to attempt to compensate stoichiometrically for its presence in water recycled to the original slurrying operation.

Accordingly, a principal object of the present invention is to provide a method for recycling expressed waste water resulting from the filter press operation back into the original slurry step. Other objects, aspects and advantages of this invention will be apparent to those skilled in the art from the following disclosure and appended claims.

SUMMARY OF THE INVENTION

Briefly stated, this invention comprises a process for manufacturing hydrous calcium silicate bonded products comprising the steps of:

(a) preparing a moldable slurry comprising calcareous and siliceous materials in water;

(b) compressing and molding said slurry under pressure sufficient to express water therefrom;

(c) curing said molded slurry to form the desired hydrous calcium silicate bonded product;

(d) recovering the expressed water of step b;

(e) contacting said water with gaseous carbon dioxide;

(f) filtering said water thereby removing suspended calcium carbonate and other solids; and (g) combining the filtered water thereby obtained with additional water to supply the water required in step (a).

DESCRIPTION OF THE INVENTION

The specific lime to silica ratio of the slurry is dependent primarily upon the desired type of crystalline hydrous silicate desired in the final product. For example, if it is desired to obtain a crystalline product predominantly composed of a crystalline matrix structure of the type commonly referred to as xonotlite ($5SiO_2.XH_2O$), a $CaO/SiO_2$ mol ratio of approximately 1/1 would be utilized in the slurry. If the desired crystalline product is tobermorite having the formula $4CaO.5SiO_2.5H_2O$, a $CaO/SiO_2$ mol ratio ranging from 0.75/1 to 0.80/1 would be employed in the slurry. In general, the $CaO/SiO_2$ molar ratio ranges from 0.65/1 to 1.3/1.

The siliceous materials employed in this invention include portland cement, siliceous sand, quartz, diatomaceous earth, clays, silica gel, pozzolana, perlite, and the like and mixtures thereof.

The calcareous materials used in this invention include Portland cement, quick lime, slaked lime and the like and mixtures thereof.

Other materials such as reinforcing fibers also can be added to the slurry mixture.

The amount of carbon dioxide bubbled through the waste water obtained from the filter press operation ordinarily should be between 50 and 150 cubic feet (measured at 60° F. and 1 atmosphere) per hour for a water throughput of 250,000 gallons in 24 hours. This will maintain a pH of about 7. This waste water will contain approximately 2% of suspended material after the carbon dioxide has reacted with the dissolved calcium hydroxide present. The manner of contacting the carbon dioxide gas with the waste water can be varied as those skilled in the art will know. It is necessary that sufficient contact between the gas and water be maintained to obtain maximum precipitation. Accordingly, spargers or mixing apparatus such as that known in the trade as "Lightning mixers" can be used. The "Lightning" type mixer generally comprises a hollow rotatable shaft having mixing blades mounted at one end submerged in water. Carbon dioxide gas is flowed through the shaft as it is rapidly rotated and is released at the mixing blades. The result is an intimate contact between gas and water.

Following the gas contacting step the water is piped to a filtration system where all suspended solids are removed. The type of filtration apparatus can be varied depending upon what is most adaptable to a given situation.

After filtration the liquid is ready for reuse in slurrying additional calcareous and siliceous materials. It will be necessary to add additional make-up water because water is consumed in the overall process.

EXAMPLE

A slurry is prepared having the following approximate composition and processed according to the filter press technique.

|  | Parts by Weight |
|---|---|
| Water | 1200 |
| CaO | 36 |
| Diatomaceous Earth ($SiO_2$) | 55 |
| Reinforcing fiber | 9 |

The expressed water from the filter press operation is collected at a rate of approximately 250,000 gallons per day and conducted into a tank where carbon dioxide gas is bubbled through the water at a rate of between 50 and 150 cubic feet per hour of $CO_2$ gas to control alkalinity at pH 7 for approximately 250,000 gallons of water per 24 hours production. The bubbling is accomplished using a lightning mixer. The water is then flowed through a filtration system where suspended matter approximating 2% by weight of the water is removed. The resultant water has a pH of approximately 7.0 and is essentially free of dissolved calcium hydroxide. The water was then returned to the point in the process where the original slurry of calcareous and siliceous material is mixed.

What is claimed is:

1. The process of manufacturing a hydrous calcium silicate insulating product comprising the steps of:

(a) mixing a moldable slurry comprising calcareous and siliceous materials in water;

(b) compressing and molding the resultant slurry under sufficient pressure to express water therefrom;

(c) curing the molded slurry from the step (b) to form a hydrous calcium silicate bonded product.

(d) collecting the expressed water accumulated in step (b) and contacting said water with carbon dioxide gas said carbon dioxide being introduced into said water in an amount sufficient to precipitate calcium carbonate;

(e) filtering the resultant mixture of suspended calcium carbonate and water; and (f) returning the treated water obtained therefrom to the mixing step (a).

2. The process of claim 1 wherein the volume of carbon dioxide gas flowing through the processing system is between about 50 and about 150 cubic feet per hour for a water throughput of about 250,000 gallons in 24 hours.

3. The process of claim 1 wherein the curing step (c) comprises:

(a) indurating the slurry with pressurized, saturated steam in an autoclave;

(b) simultaneously indurating and drying the slurry with superheated steam to convert the slurry to a hydrous calcium silicate product; and (c) reducing the pressure in the autoclave to atmospheric pressure prior to removal of the product wherein at least 10% by weight of solids of free moisture is retained in the slurry and the product, and removing the product from the autoclave.

4. The process of claim 1 wherein the volume of carbon dioxide gas flowed through the processing system is that amount sufficient to maintain a pH of about 7.

* * * * *